United States Patent
Matsuo et al.

[11] Patent Number: 5,997,070
[45] Date of Patent: Dec. 7, 1999

[54] WINDSHIELD DEVICE IN A MOTORCYCLE

[75] Inventors: Hisashi Matsuo; Shin Watanabe; Mituru Yamamoto, all of Saitama, Japan

[73] Assignee: Honda Giken Kogyo Kabushiki Kaisha, Tokyo, Japan

[21] Appl. No.: 08/890,883

[22] Filed: Jul. 10, 1997

[30] Foreign Application Priority Data

Jul. 10, 1996 [JP] Japan .................................. 8-180469

[51] Int. Cl.⁶ .................................................. B62J 17/00
[52] U.S. Cl. ...................... 296/78.1; 296/180.1; 180/903
[58] Field of Search ............................. 296/78.1, 180.1, 296/84.1, 90, 91; 180/903

[56] References Cited

U.S. PATENT DOCUMENTS

| | | | |
|---|---|---|---|
| 2,564,800 | 8/1951 | Bates | 296/78.1 |
| 2,903,297 | 9/1959 | Zbikowski | 296/78.1 |
| 4,066,291 | 1/1978 | Hickman | 296/91 X |
| 4,867,397 | 9/1989 | Pamadi et al. | 296/91 X |
| 5,658,035 | 8/1997 | Armstrong | 296/78.1 |
| 5,845,955 | 12/1998 | Willey | 296/84.1 X |

FOREIGN PATENT DOCUMENTS 144268  12/1953  Switzerland ............................. 296/91

*Primary Examiner*—D. Glenn Dayoan
*Assistant Examiner*—Jason Morrow
*Attorney, Agent, or Firm*—Birch, Stewart, Kolasch & Birch, LLP

[57] ABSTRACT

A screen for attachment to an front forked portion of a motorcycle has improved aerodynamic characteristics. An upper garnish is located on the forward side of the screen. The upper garnish extends substantially horizontally across the screen. An expanded portion protrudes forwardly and extends substantially across the entire length of the upper garnish. The expanded portion redirects any horizontal air current impacting thereagainst. The redirected air current influences the horizontal air currents impacting the screen by causing a turbulence area slightly in front of the screen. This turbulence acts to lessen the impact of the horizontal air currents against the screen, resulting in a decrease in an overall running resistance of the motorcycle.

14 Claims, 5 Drawing Sheets

WINDSHIELD DEVICE IN A MOTORCYCLE

BACKGROUND OF THE INVENTION

1. Field of the Invention

The present invention relates to a windshield device to be mounted to a front wheel suspension of a motorcycle, or similar vehicle.

2. Description of Background Art

It is known to mount a screen to an upper, front portion of a motorcycle to shield a rider from wind and other elements. For example, a screen may be mounted to a front cowling or a front wheel suspension of a motorcycle.

When the screen is subjected to air currents during movement of the motorcycle, forces such as drag and lift are exerted on the screen and are transmitted from the screen to the motorcycle. These drag and lift forces intensify as the screen size increases. If the screen is mounted to the front wheel suspension, the forces are exerted directly to the front wheel suspension, thus changing the performance and characteristics of the suspension.

SUMMARY AND OBJECTIONS OF THE INVENTION

It is an object of the present invention to reduce the forces transmitted to a motorcycle's body or front wheel suspension due to the lift and drag forces exerted on the screen. Accordingly, the present invention provides a windshield device with improved aerodynamic characteristics. The windshield device is capable of being mounted to a front wheel suspension of a motorcycle. Because of the screen's improved aerodynamic characteristics, the lift and drag forces exerted on the screen, at a given speed, are less than the lift or drag forces which would have been exerted on a screen constructed in accordance with the prior art. Therefore, the improved screen transmits a lower magnitude of forces to the front suspension.

According to the present invention, there is provided a windshield device capable of attachment to a vehicle. The windshield device includes a screen having a forward face. The forward face faces a direction of travel of the vehicle. A first elongated rib is attached to the forward face. A first expanded portion is formed on the first elongated rib. The first expanded portion protrudes forwardly toward the direction of travel of the vehicle, and extends across substantially an entire length of the first elongated rib. By this arrangement, an air current impacting the first elongated rib will be redirected along a path adjacent to the forward face and will cause a turbulence area adjacent the forward face.

The present invention, causes air to flow upwards from the first elongated rib along the forward face of the screen. The air flows adjacent the screen's forward face when flowing beyond the elongated rib, and produces a turbulent flow, such as a vortex flow, in the region above the elongated rib and adjacent the screen's forward face.

Once such a turbulent flow region is generated, the angle between the flowing direction of air which has flowed backward beyond the upper end of the screen and the vehicular running direction becomes smaller than in the absence of such a turbulent flow region. This occurrence results in a decrease in the influence of drag or lift on the screen. In other words, the running resistance of the motorcycle becomes lower.

If the elongated rib, mounted on the forward face of the screen, is also used in fixing the screen to the front wheel suspension, there is no increase in the number of components.

Further, if plural elongated ribs are located around an aperture formed in the screen, the arrangement increases the amount of air flowing backward of the screen through a clearance between the screen and a head lamp fitted in the aperture. This increased flow results in the pressure difference before and after the screen be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
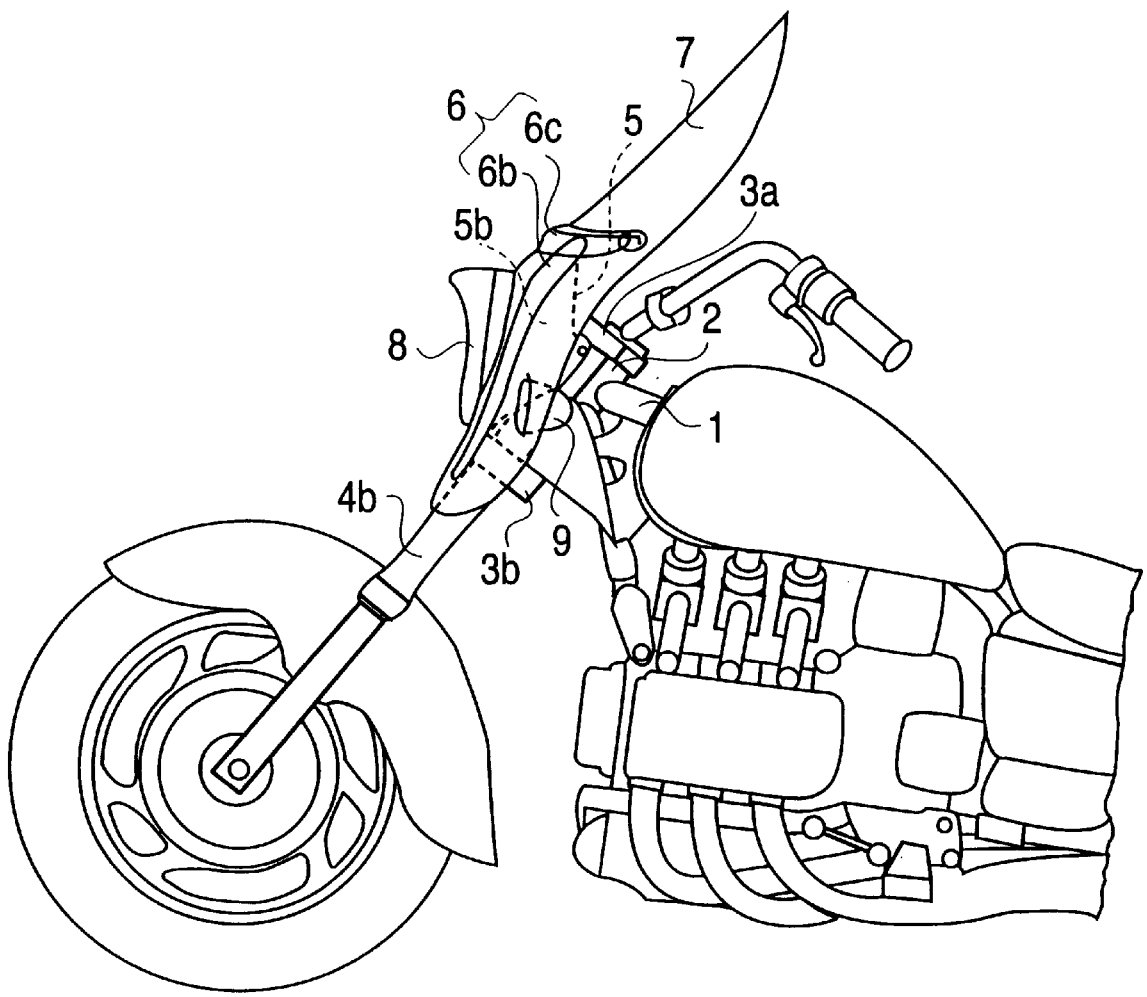
FIG. 1 is a side view of a motorcycle with a screen device, according to the present invention, mounted thereto.
Figure 2:
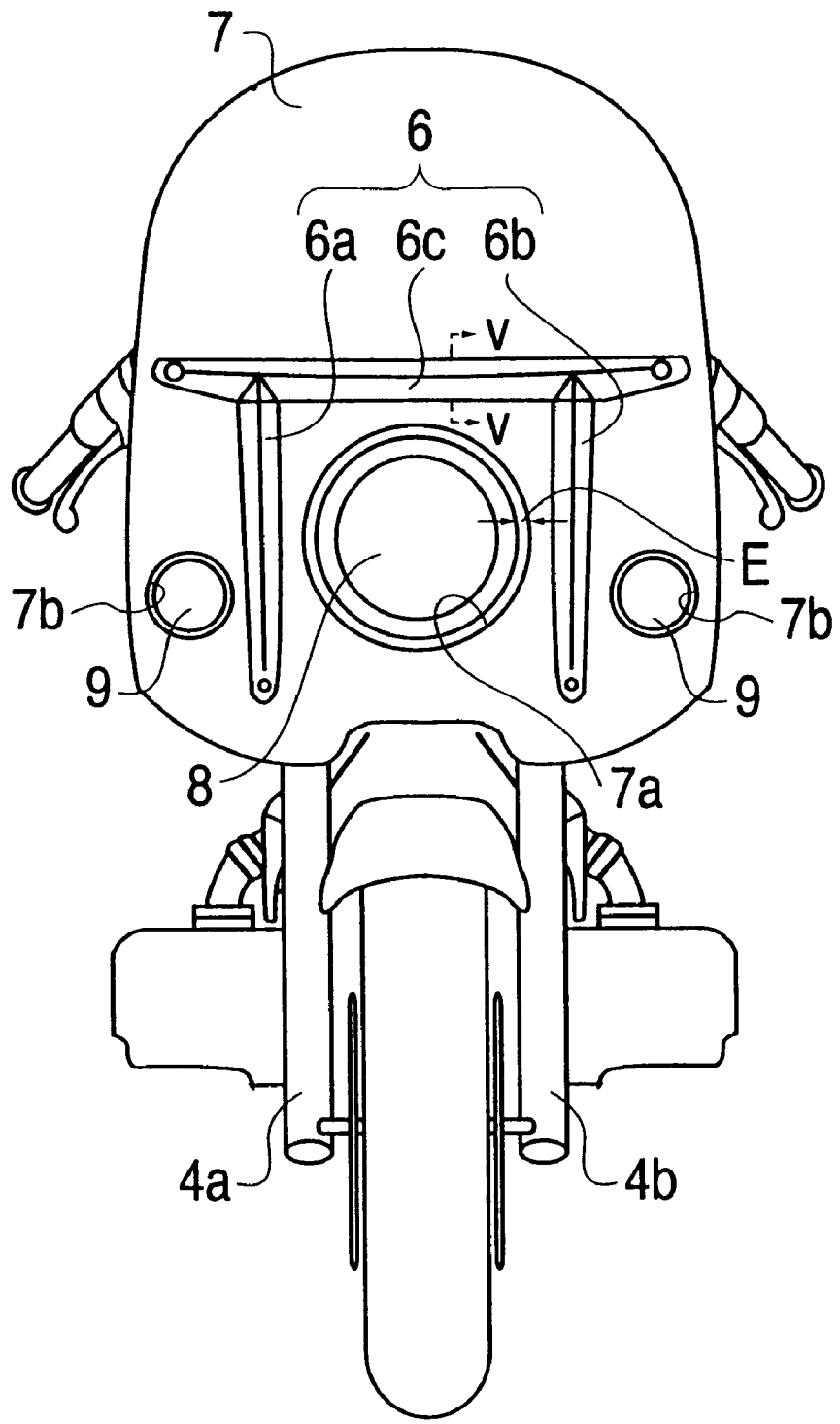
FIG. 2 is a front view of the motorcycle shown in FIG. 1.
Figure 3:
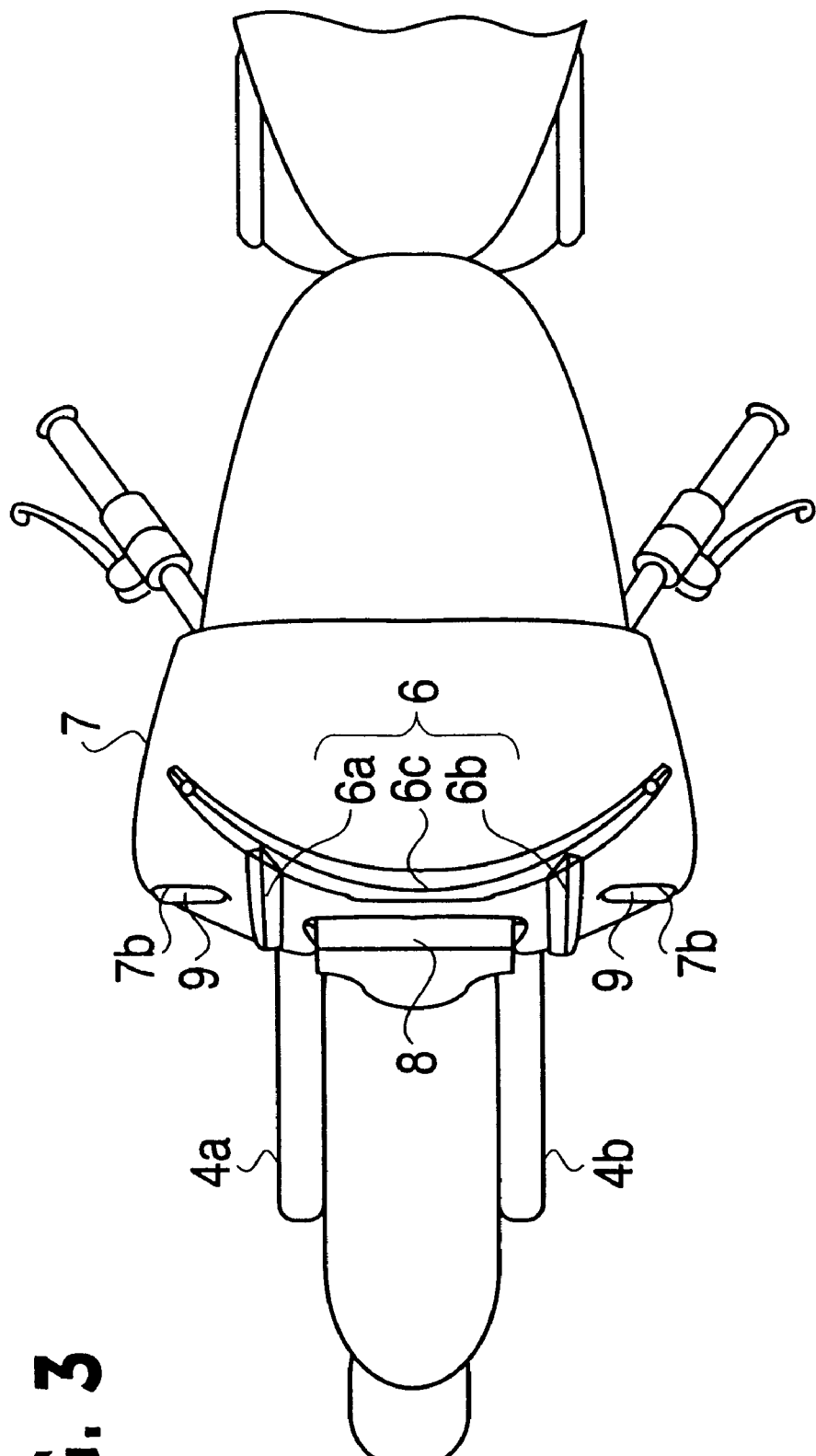
FIG. 3 is a top view of the motorcycle shown in FIG. 1.

Referring to FIGS. 1 to 3, the numeral 1 denotes a body frame of a motorcycle. A steering head 2 which supports a front wheel suspension rotatably is attached to the front end of the body frame 1. A steering shaft (not shown) of the front wheel suspension is attached rotatably to the steering head 2, and an upper bridge 3a is mounted on the upper end of the steering shaft, while a lower bridge 3b is mounted to the lower end of the steering shaft. A pair of front forked portions 4a and 4b are mounted right and left of both bridges 3a, 3b, and the upper ends of both front forked portions 4a and 4b are held by the upper bridge 3a. Further, a stay 5 is secured to the front forked portions 4a and 4b. A screen 7 is held between the stay 5 and an elongated rib, or garnish, 6 which is secured to the stay 5. By this arrangement, the screen is fixed relative to the front wheel suspension.

Figure 4:
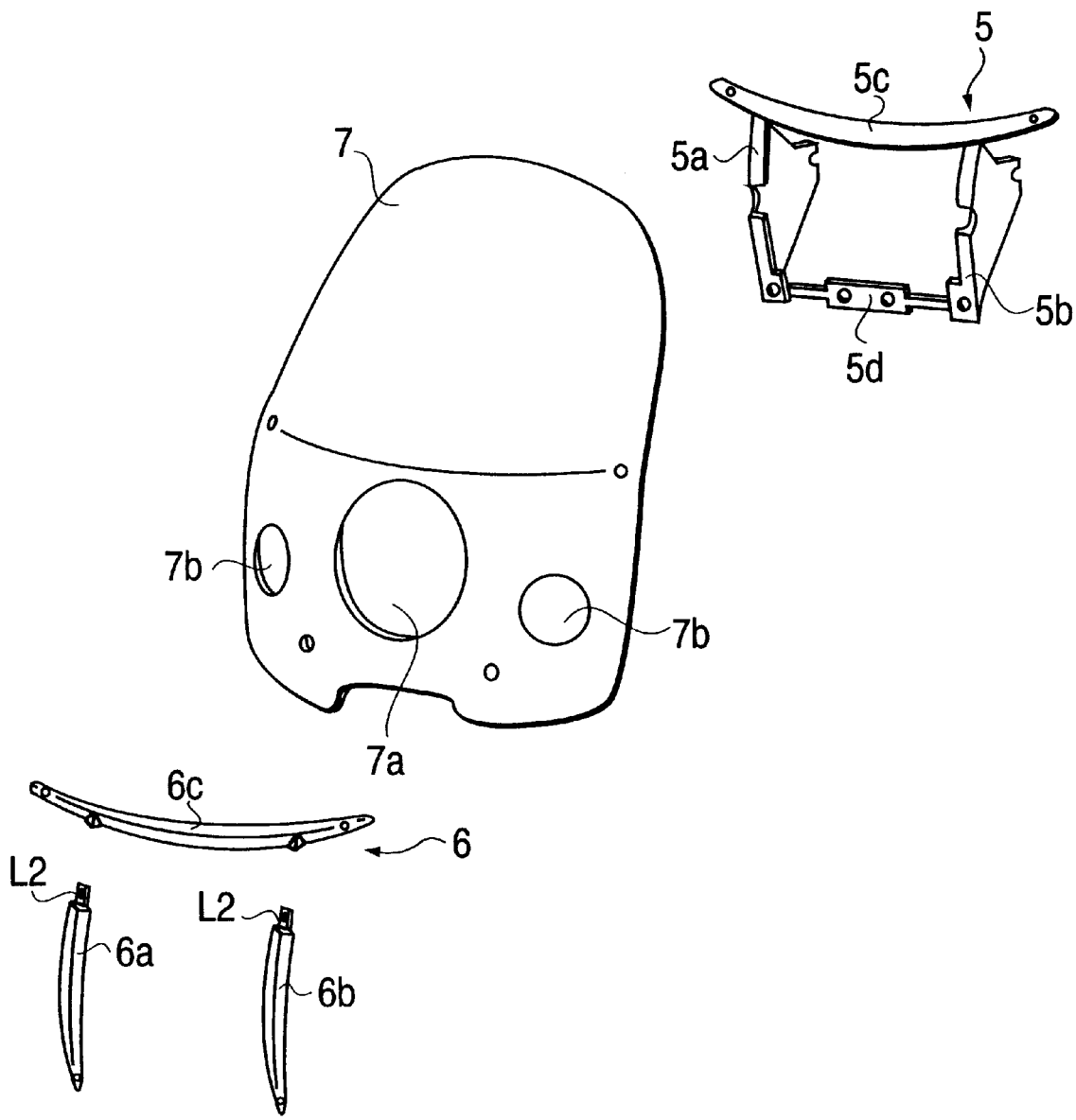
FIG. 4 is an exploded perspective view showing the screen, a stay and garnishes.

As shown in FIG. 4, the stay 5 is provided with a pair of side plates 5a and 5b. The side plates 5a and 5b are secured to the front forked portions 4a and 4b through mounting means (not shown). An upper plate 5c extends transversely and bridges the upper ends of both side plates 5a and 5b. A bottom plate 5d connects the lower ends of both side plates 5a and 5b. Also, the bottom plate 5d is connected to the lower bridge 3b with bolts.

The garnish 6 is provided with a pair of side garnishes 6a and 6b and an upper garnish 6c. The screen 7 is located in between the garnish 6 and the stay 5. The side garnishes 6a and 6b are fixed with bolts to the front faces of the side plates 5a and 5b. The upper garnish 6c is fixed with bolts to the front face of the upper plate 5c. This configuration results in the screen 7 being sandwiched between the plates 5a to 5c and the garnishes 6a to 6c. Therefore, the screen 7 becomes fixed relative to the front wheel suspension.

The screen 7 is convex relative to the front of the motorcycle. The screen 7 is smoothly curved from its central portion toward its edges. In an area of the screen 7 surrounded by the garnishes 6a to 6c, there is formed a central aperture 7a for a head lamp 8. The central aperture 7a is oversized such that when the screen 7 is installed, a clearance E occurs between the edges of the central aperture 7a and the head lamp 8. The screen 7 also includes side apertures 7b, 7b for turn signals, or blinkers, 9. The side apertures 7b, 7b are formed on the right and left sides of the central aperture 7a in obliquely downward locations.

When the motorcycle is moving, horizontal air currents are exerted on the screen 7. The horizontal air currents cause drag and lift forces on the screen. With the screen 7 being mounted to the front wheel suspension, these drag and lift forces are transmitted directly to the front forked portions 4a and 4b.

Figure 5:
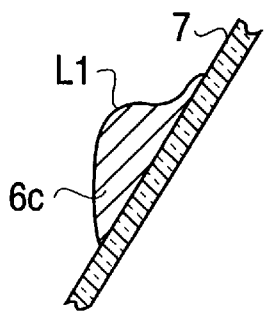
FIG. 5 is a sectional view taken on line V—V in FIG. 2.

As shown in FIG. 5, the upper garnish 6c is formed with an expanded portion L1. The expanded portion L1 protrudes forwardly and extends substantially across the entire length of the upper garnish 6c. The expanded portion L1 upwardly redirects any horizontal air current impacting against the upper garnish 6c. The upwardly redirected air current influences the horizontal air currents impacting the screen above the upper garnish 6c by causing turbulence in the horizontal air currents just before they impact the screen. This turbulence acts to lessen the impact of the horizontal air currents against the screen resulting in a decrease in an overall running resistance of the motorcycle.

As shown in FIG. 5, the expanded portion L1 of the upper garnish 6c has a rounded peak portion which extends along its length and an upper slanted face which extends along its length and slants from the rounded peak portion to an upper edge of the upper garnish 6c. A longitudinal recess is formed in the upper slanted face. However, the expanded portion L1 is not limited to the shape depicted in FIG. 5. The shape may be varied, keeping in mind the important consideration that the shape must cause the flow of air to be separated from the screen surface and redirected.

Figure 6A:
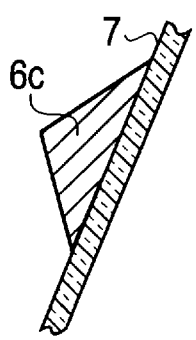
FIGS. 6(A), 6(B) and 6(C) are sectional views each showing a cross-sectional shape of an expanded portion of an upper garnish.
Figure 6B:
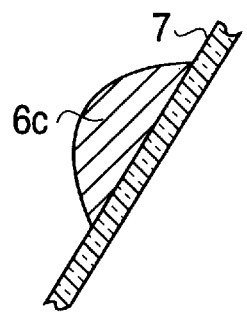
Figure 6C:
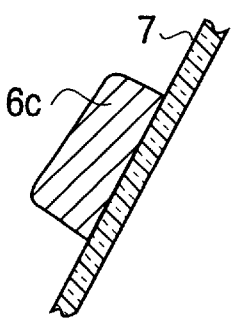

Alternative shapes for the expanded portion L1 envisioned by the present invention are shown in FIGS. 6(A) to 6(C). FIG. 6(A) illustrates the expanded portion L1 having a triangular cross-sectional shape with a sharp peak part. FIG. 6(B) illustrates the expanded portion L1 having a circular or elliptical cross-sectional shape. Thus, the expanded portion L1 in its entirety would resemble a half-cylindrical shape. FIG. 6(C) illustrates the expanded portion L1 having a polygonal cross-sectional shape. More specially, FIG. 6(C) illustrates the expanded portion L1 having a substantially square cross-sectional shape.

As shown in FIG. 4, each of the side garnishes 6a and 6b may also be formed with an expanded portion L2. Each expanded portion L2 protrudes forwardly and extends substantially across the entire length of a respective one of the side garnishes 6a and 6b. The use of the expanded portions L2 of the side garnishes 6a and 6b result in air, from the front of the screen, having an increased flow backward of the screen 7 through the clearance E formed between the screen 7 and the head lamp 8. The increased flow results in the pressure difference before and after the screen decreasing. With decrease of the pressure difference, a so-called back pressure applied to a rider during vehicular running and noises which are offensive to the ear, are diminished.

The cross-sectional shape of an expanded portion L2 may be the same as, or different from, the cross-section shape of the expanded portion L1. Further, the cross-sectional shape of an expanded portion L2 may be selected from one of the cross-sectional shapes illustrated in FIG. 5 and FIG. 6(A) to FIG. 6(C).

According the present invention, tapped holes are formed in the garnishes 6a to 6c so as to open only on the back side of the garnishes. Bolts are inserted from the back side of the stay 5 and brought into threaded engagement with the tapped holes. The threaded engagement causes the screen to be fixed between the garnishes and the stay 5. By having the tapped holes opening only on the backside of the garnishes, the aerodynamic characteristics of the garnishes are improved since the smooth outer surfaces of the expanded portions L1 and L2 will be unencumbered by bolts or fasteners.

According to the present invention, as set forth above, the influence of a drag or a lift can be diminished. In other words, the running resistance induced by the presence of a windshield can be decreased.

Also according to the present invention, as set forth above, the amount of air flowing backward of the screen through the clearance formed between the screen and the head lamp increases, thus resulting in a decrease in the pressure difference before and after the screen.

Further benefits of the present invention include, that the garnishes 6a to 6c serve the dual purpose of fastening the screen onto the motorcycle and improving the aerodynamic characteristics of the screen. Therefore, the improvement to the aerodynamic characteristics of the screen is accomplished without the need for additional components or additional installation labor. Also, because the garnishes are located in area of the screen typically used for the fasteners of the prior art, the rider's front visibility is not impaired. Further, the expanded portions L1 and L2 serve to increase the rigidity of the garnishes 6a to 6c. Therefore, the screen 7 can be more securely and firmly fixed to the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A windshield device for attachment to a vehicle, said windshield device comprising:

a screen having a forward face, said forward face facing a direction of travel of the vehicle;

a first elongated rib, attached to said forward face;

a first expanded portion formed on said first elongated rib, said first expanded portion protruding forwardly toward the direction of travel of the vehicle, said first expanded portion including a concave surface, and said first expanded portion extending across substantially an entire length of said first elongated rib, wherein an air current impacting said first elongated rib will be redirected away from said concave surface along a path adjacent to said forward face and will cause a turbulence area adjacent said forward face; and a stay for attachment to a front wheel suspension member of the vehicle, wherein said screen is sandwiched between said stay and said first elongated rib, and wherein said first elongated rib is attached to said stay.

2. The device of claim 1, wherein:
said first elongated rib extends substantially horizontally across said forward face.

3. A windshield device for attachment to a vehicle, said windshield device comprising:
a screen having a forward face, said forward face facing a direction of travel of the vehicle, wherein said screen includes an aperture enclosed by edges of said screen for allowing a head lamp of the vehicle to protrude therethrough, said aperture being oversized such that a clearance is provided between at least one edge of said screen and the head lamp;
a first elongated rib, attached to said forward face;
a first expanded portion formed on said first elongated rib, said first expanded portion protruding forwardly toward the direction of travel of the vehicle, said first expanded portion including a concave surface, and said first expanded portion extending across substantially an entire length of said first elongated rib, wherein an air current impacting said first elongated rib will be redirected away from said concave surface along a path adjacent to said forward face and will cause a turbulence area adjacent said forward face: and
a second elongated rib, said second elongated rib including a second expanded portion, said second expanded portion protruding forwardly toward the direction of travel of the vehicle, and said second expanded portion extending across substantially an entire length of said second elongated rib,
wherein an air current impacting said second elongated rib will be redirected along a path adjacent to said forward face and will cause a turbulence area adjacent said forward face.

4. The device of claim 3, further including:
a third elongated rib, said third elongated rib including a third expanded portion, said third expanded portion protruding forwardly toward the direction of travel of the vehicle, and said third expanded portion extending across substantially an entire length of said third elongated rib,
wherein an air current impacting said third elongated rib will be redirected along a path adjacent to said forward face and will cause a turbulence area adjacent said forward face.

5. The device of claim 4, wherein:
said first elongated rib is located above said aperture and extends substantially horizontally across said forward face;
said second elongate rib is located to one side of said aperture and extends substantially vertically across said forward face; and
said third elongate rib is located to another side of said aperture and extends substantially vertically across said forward face.

6. A windshield device for attachment to a vehicle, said windshield device comprising:
a screen having a forward face, said forward face facing a direction of travel of the vehicle;
a first elongated rib, attached to said forward face;
a first expanded portion formed on said first elongated rib, said first expanded portion protruding forwardly toward the direction of travel of the vehicle, said first expanded portion including a concave surface, and said first expanded portion being present at portions of said first elongated rib across a length of said first elongated rib, wherein an air current impacting said first elongated rib will be redirected away from said concave surface along a path adjacent to said forward face and will cause a turbulence area adjacent said forward face; and
a stay for attachment to a front wheel suspension member of the vehicle, wherein said screen is sandwiched between said stay and said first elongated rib, and wherein said first elongated rib is attached to said stay.

7. The device of claim 6, wherein:
said first elongated rib extends substantially horizontally across said forward face.

8. A windshield device for attachment to a vehicle, said windshield device comprising:
a screen having a forward face, said forward face facing a direction of travel of the vehicle, wherein said screen includes an aperture enclosed by edges of said screen for allowing a head lamp of the vehicle to protrude therethrough, said aperture being oversized such that a clearance is provided between at least one edge of said screen and the head lamp;
a first elongated rib, attached to said forward face;
a first expanded portion formed on said first elongated rib, said first expanded portion protruding forwardly toward the direction of travel of the vehicle, said first expanded portion including a concave surface, and said first expanded portion being present at portions of said first elongated rib across a length of said first elongated rib, wherein an air current impacting said first elongated rib will be redirected away from said concave surface along a path adjacent to said forward face and will cause a turbulence area adjacent said forward face; and
a second elongated rib, said second elongated rib including a second expanded portion, said second expanded portion protruding forwardly toward the direction of travel of the vehicle, and said second expanded portion extending across substantially an entire length of said second elongated rib,
wherein an air current impacting said second elongated rib will be redirected along a path adjacent to said forward face and will cause a turbulence area adjacent said forward face.

9. The device of claim 8, further including:
a third elongated rib, said third elongated rib including a third expanded portion, said third expanded portion protruding forwardly toward the direction of travel of the vehicle, and said third expanded portion extending across substantially an entire length of said third elongated rib,
wherein an air current impacting said third elongated rib will be redirected along a path adjacent to said forward face and will cause a turbulence area adjacent said forward face.

10. The device of claim 9, wherein:
said first elongated rib is located above said aperture and extends substantially horizontally across said forward face;
said second elongate rib is located to one side of said aperture and extends substantially vertically across said forward face; and
said third elongate rib is located to another side of said aperture and extends substantially vertically across said forward face.

11. A windshield device for attachment to a vehicle, said windshield device comprising:

a screen having a forward face, said forward face facing a direction of travel of the vehicle, wherein said screen includes an aperture enclosed by edges of said screen for allowing a head lamp of the vehicle to protrude therethrough, said aperture being oversized such that a clearance is provided between at least one edge of said screen and the head lamp;

a first elongated rib, attached to said forward face; and a first expanded portion formed on said first elongated rib, said first expanded portion protruding forwardly toward the direction of travel of the vehicle, said first expanded portion including a concave surface, and said first expanded portion extending across substantially an entire length of said first elongated rib, wherein an air current impacting said first elongated rib will be redirected away from said concave surface along a path adjacent to said forward face and will cause a turbulence area adjacent said forward face, wherein:

said aperture is shaped symmetrical to a perimeter of the head lamp, and wherein a clearance is formed between all of the edges of the screen forming the aperture and the head lamp.

12. A windshield device for attachment to a vehicle, said windshield device comprising:

a screen having a forward face, said forward face facing a direction of travel of the vehicle, wherein said screen includes an aperture enclosed by edges of said screen for allowing a head lamp of the vehicle to protrude therethrough, said aperture being oversized such that a clearance is provided between at least one edge of said screen and the head lamp;

a first elongated rib, attached to said forward face; and a first expanded portion formed on said first elongated rib, said first expanded portion protruding forwardly toward the direction of travel of the vehicle, said first expanded portion including a concave surface, and said first expanded portion being present at portions of said first elongated rib across a length of said first elongated rib, wherein an air current impacting said first elongated rib will be redirected away from said concave surface along a path adjacent to said forward face and will cause a turbulence area adjacent said forward face, wherein:

said aperture is shaped symmetrical to a perimeter of the head lamp, and wherein a clearance is formed between all of the edges of the screen forming the aperture and the head lamp.

13. The device of claim 3, wherein:

said first elongated rib extends substantially horizontally across said forward face.

14. The device of claim 8, wherein:

said first elongated rib extends substantially horizontally across said forward face.

\* \* \* \* \*